(12) United States Patent
Nair et al.

(10) Patent No.: US 6,858,174 B2
(45) Date of Patent: Feb. 22, 2005

(54) PROCESS FOR CASTING CERAMIC MATERIALS

(75) Inventors: Balakrishnan G. Nair, Salt Lake City, UT (US); Merrill A. Wilson, West Jordan, UT (US); Shekar Balagopal, Sandy, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 0 days.

(21) Appl. No.: 10/233,803

(22) Filed: Sep. 3, 2002

(65) Prior Publication Data

US 2004/0043204 A1 Mar. 4, 2004

(51) Int. Cl.$^7$ ................................................ B28B 1/00
(52) U.S. Cl. ..................... 264/669; 264/234; 264/635
(58) Field of Search ................ 264/42, 234, 635, 264/669; 428/34.4, 357

(56) References Cited

U.S. PATENT DOCUMENTS

| | | | | | |
|---|---|---|---|---|---|
| 4,574,063 A | * | 3/1986 | Scherer | ...................... | 65/395 |
| 4,639,388 A | * | 1/1987 | Ainsworth et al. | .......... | 428/117 |
| 5,858,313 A | * | 1/1999 | Park et al. | ................... | 422/189 |
| 6,284,682 B1 | * | 9/2001 | Troczynski et al. | ............ | 501/12 |
| 6,660,192 B1 | * | 12/2003 | Kim et al. | ................. | 264/1.27 |

* cited by examiner

*Primary Examiner*—Peter Chin
*Assistant Examiner*—Carlos Lopez
(74) *Attorney, Agent, or Firm*—TraskBritt

(57) ABSTRACT

A process for producing ceramic, or ceramic composite, components having microfeatures by creating a chemical reaction in a castable slurry to bond nano-sized or submicron-sized ceramic powders. The bonding process that gives coherency and strength to the material creates a reaction product or gel-phase resulting from a chemical reaction between the ceramic powder and a reagent, such as an acid, alkali, or inorganic salt solution, that binds the ceramic powder. This gel-phase can be de-hydrated, cured, or crystallized by a higher-temperature firing step, but at a temperature lower than the temperature range at which sintering starts to occur in the ceramic (typically lower than 1,000°C.)

45 Claims, 4 Drawing Sheets

PROCESS FOR CASTING CERAMIC MATERIALS

TECHNICAL FIELD

The invention relates generally to the manufacture of ceramic materials and particularly to a casting process capable of forming components having reproducible features as small as one micron with submicron dimensional tolerance and components produced by the process.

BACKGROUND

Current processes used for microcomponent fabrication, primarily based on silicon processing technology, are relatively expensive and often do not meet the production rates required for certain specific components, such as for optical component fabrication (e.g., fiber connectors and beam splitters). Furthermore, silicone-based components generally lack the desired high-temperature performance for chemical industry applications (e.g., microchannel devices for gas separation/reforming). Conventional micromachining techniques to form high-precision components (e.g., wet and dry etching) are very slow and expensive processes and often do not provide the desired production rates and cost criteria required for bulk production of components. Further, most of these processes are specific for silicon, which has a relatively low fracture toughness (0.7–0.8 $MPa.m^{1/2}$) and is subject to severe corrosion in high-temperature oxidizing conditions typical of industrial chemical processes employing microchannel devices.

Optic fiber connectors based on V-groove designs are currently fabricated by etching silicon wafers. For efficient operation, the fiber axes must be precisely aligned with respect to each other to submicron tolerances. The V-groove design allows such precise alignment. Silicon wafers are usually used for this application as the end users, i.e., the optic fiber communications industry, have strong historical, commercial and technological ties with the semiconductor manufacturing industry. Silicon wafer fabrication technology is a relatively mature technology, and it can be used to fabricate microcomponents with extremely high dimensional tolerances, frequently in the nanometer range, through precisely controlled etching of single crystal silicon along crystallographic planes.

Fabrication of silicon wafers with relatively complex geometries, however, usually involves multiple steps including photolithography, wet/dry etching, anisotropic etching and reactive-ion etching. In many cases, the required production rates and market demand is greater than that achievable with etched silicon wafers. The process is further complicated if the components are designed as beam-splitters or source-to-fiber connectors where grooves in non-crystallographic directions are frequently required.

Further, there are limitations in thickness of commercially available wafers due to the difficulty of fabricating thick single-crystalline wafers, and therefore the strengths of the etched wafers themselves are not sufficient for most applications. This limitation is currently overcome by joining/laminating the wafer with secondary support materials, like polycrystalline silicon or silica, for mechanical reliability. This requirement for a mechanical support adds an additional joining step to the process.

Ceramic materials have excellent corrosion and mechanical properties that make them very attractive for high-temperature applications. However, current processing techniques for microdevices made of ceramics are even more expensive than silicon technology. Most of these processes require sintering at a high temperature accompanied by a linear shrinkage of more than 20%, a process that is very difficult to accurately model, and therefore the component dimensions are difficult to control to required tolerances.

Ceramic nanoporous materials are of tremendous interest in the chemical and transportation industry as they are ideal support materials for catalysts and adsorbents in gas-phase processes including chemical reactions, gas refinement/purification and pollution control. The current use of nano-materials in large-scale industrial processes is primarily in the form of wet or dry packed beds. Packed beds typically consist of catalytic materials (e.g., $CeO_2$, $V_2O_5$, Pt) doped into, or deposited on, high surface area powders of a support material like $\alpha$-$Al_2O_3$. Packed bed reactors typically have very high capital and operating costs and are plagued by problems of high pressure drop and low flow rates for designs where the flow is through the bed, and by problems of low efficiency when the flow is over the bed. Further, for packed bed scrubbers used for pollution control to remove toxic gases like Nitrogen oxides ($NO_x$) and sulfur-dioxide ($SO_2$) from stack gases, the gases need to be cooled prior to passing through the packed bed. In automotive applications, currently, the most advanced catalytic converters use palladium and platinum on nanoporous ceramic coatings ($CeO_2$ doped $Al_2O_3$) supported on metallic honeycomb structures. The use of the honeycomb support structures is primarily due to the technical difficulties and processing costs associated with monolithic nanoporous ceramic structures. Most conventional ceramic processing techniques to form components with stable structures involve sintering at temperatures above 1,000° C. Exposure to these temperatures significantly lowers the surface area of the fired component.

One known manufacturing technique for certain ceramic components uses phosphate bonding through a chemical reaction between a ceramic powder and phosphoric acid. Phosphate-bonded cements have been around for more than two decades and have largely been used for making refractory bricks for metallurgical furnaces. Phosphate bonded alumina ceramics have also been used for dental applications. The known ceramic component manufacturing processes have been used primarily for large-scale components, such as bricks and other large components. Limitations inherent in known manufacturing techniques render them incapable of forming components having certain desired small feature sizes being reproducible to micrometer accuracy in a molded or cast part.

It would be an improvement in the fabrication art to provide a low-temperature, net-shape (or near net-shape) fabrication technique, based on chemical reaction bonding, that is efficient, cost-effective, scalable, and more environmentally friendly. Desirably, the improved fabricating technique would produce ceramic-based components having reproducible features smaller than about one-tenth of a millimeter, and as small as one micrometer (micron, or $10^{-6}$ m), or even smaller. A desirable fabricating technique would replicate features of a mold surface with at least a one micrometer tolerance.

BRIEF SUMMARY OF THE INVENTION

The invention provides a process for casting ceramic-based components. The process generally includes the steps of: a) combining a ceramic powder (having a mean particle size typically between about submicron and one nanometer) with a reagent to form a slurry; b) casting the slurry in a mold; c) curing the slurry in the mold at a temperature below about 100° C. to form a green component by a process including chemical reaction bonding of the powder under the influence of the reagent; and d) applying a heat treatment at a temperature below about 1,000° C. to the green component. The heat treatment process dries, crystallizes and fixes the component. Most times, the process further includes, between steps c) and d), the step of removing the green component from the mold. The process may further include the steps of: prior to step b), placing a core into the mold to define a shape in the component; and subsequent to step c), removing the core from the component. Certain cores may be removed from a green component by burning or melting them. Certain components may have features formed by a stamping operation subsequent to the casting process.

Typically, the reagent is in liquid form and may be an acid, alkali, or inorganic salt solution. In general, the ceramic powder has a controlled particle size distribution ranging from about one nanometer to about 500 nanometers, although ceramic powders having larger and smaller particle sizes, or a variety of particle sizes, are also workable. Desirable ceramic powders typically have a surface area in excess of about 10 $m^2$/gram. The process may also include adding a second ingredient in powder form into the slurry to improve a physical property of the cast component. The ceramic powder and the second ingredient can be premixed in powder form, or can be separately added to the slurry mixture. Sometimes, the ceramic powder and the second ingredient have a multimodal particle size distribution in combination. In certain cases, a multimodal particle distribution may be present in the ceramic powder alone. In other cases, the ceramic powder may contain particles having substantially the same size. Certain second ingredients that can be added to a baseline ceramic powder nonexclusively include: a metallic powder; an ion or electron conducting material; a pore-former; a second ceramic powder, a material having a coefficient of thermal expansion (CTE) that is different than the CTE of the baseline ceramic powder; a reinforcing fiber; and a catalytic material. The process can be used to form a component adapted for use in electronic packaging, or for use as a microchannel device, among other potential applications.

BEST MODE OF THE INVENTION

Figure 1:
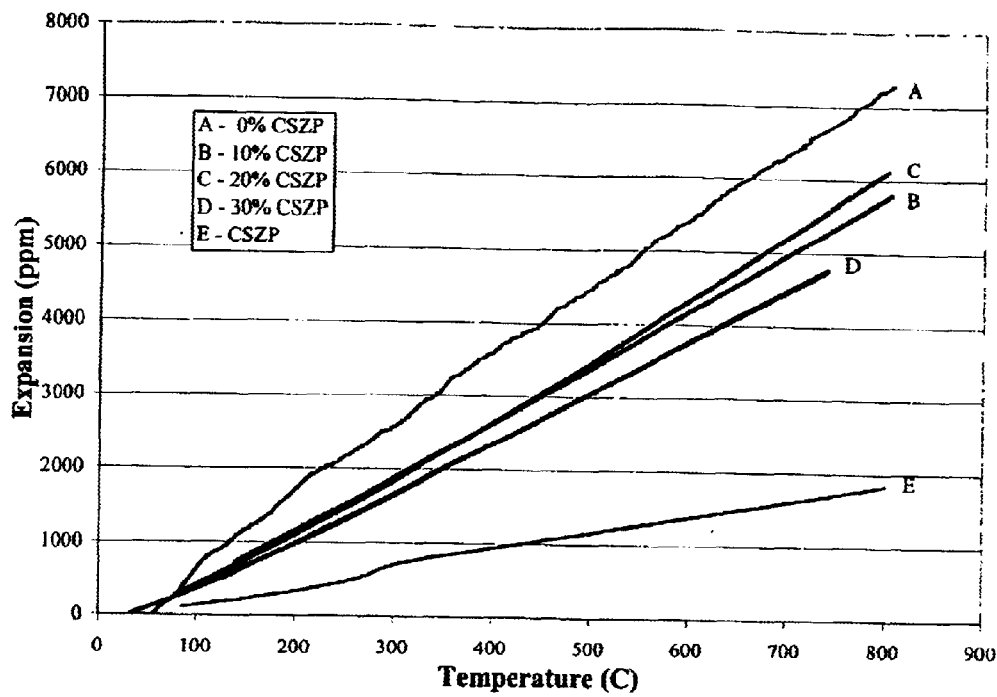
FIG. 1 is a plot of expansion, over a range of temperatures, for two component materials and two materials formed as a volumetric mixture of the two component materials.

The present invention relates to a fabrication technique that has relevance to a number of industrial sectors including fiber optic communications and the chemical industry. This invention provides a cost-effective technique for microfabrication of components with properties and/or production efficiency comparable or superior to silicon technology. The invention may be practiced without production of toxic byproducts. The instant invention utilizes reaction-bonding of nano- and submicron sized particulates to facilitate the fabrication of components with critical feature dimensions typically ranging from perhaps one micrometer, or less, to several millimeters. Reaction-bonding eliminates the problems associated with shrinkage of ceramics during the sintering step used in most ceramic manufacturing processes. The material produced in the instant process is a ceramic, or a composite of a ceramic matrix, or binder, and another phase which can be one or more of a second ceramic, a metal, a polymer, or an alternative beneficial material. The microstructure of a material formed by practicing the invention can be tailored for specific applications by simple changes in the manufacturing process.

The instant process typically includes casting a slurry. The slurry may be poured into a mold to form net-shape, or near-net-shape, components. Certain desirable components can be manufactured at least substantially to a net shape by reaction-bonding ceramic powder, the powder having ceramic particulate sizes in the nanometer range, with a reagent.

The invention is further explained by the following illustrative Examples.

EXAMPLE I

Baseline Ceramic Castable Nanomaterial

A baseline ceramic castable nanomaterial (CERCANAM™ material-Ceramatec, Salt Lake City, Utah, US) is formed by mixing a ceramic ($Al_2O_3$) in nanopowder form with phosphoric acid ($H_3PO_4$) at room temperature to form a slurry. The resulting slurry can be cast in a mold, injection molded, or stamped with a die to form a net-shape, or near-net-shape, component. (For purposes of this disclosure, all of casting in a mold, injection molding, and die stamping are considered to be equivalent to a casting operation.) The slurry is then permitted to dry, typically at an elevated temperature such as 50–100° C. A green component may be removed from a mold for heat treatment, or the assembled mold and component may be subjected to a higher temperature heat treating, or firing, step (generally at less than 1,000° C.) to permanently crystalize the CERCANAM™ material forming the component. Green components can actually disintegrate in water prior to fixing of their structure.

CERCANAM™ materials may be formed by combining any ceramic in powder form (typically having submicron particulate size) with any workable reagent. Workable reagents form a chemical reaction with the powdered ceramic base material to produce CERCANAM™ material as a reaction product. Suitable reagents include various acids, alkalis, and inorganic salt solutions, nonexclusively including: phosphoric acid ($H_3PO_4$), sodium hydroxide (NaOH), potassium hydroxide (KOH), magnesium hydroxide ($Mg(OH)_2$), calcium hydroxide ($Ca(OH)_2$), barium hydroxide ($Ba(OH)_2$), calcium carbonate ($CaCO_3$), and sodium carbonate ($NaCO_3$). Concentration of the reagent is not generally a critical parameter. For example, phosphoric acid having a concentration of between about 5% and about 85% has been found to be workable, although even these indicated upper and lower bounds are not firm barriers.

For purpose of this disclosure, a ceramic nanopowder can be defined as a powder including ceramic material particles having a mean diameter of less than about 150 nm. A rule of thumb to estimate mean particulate size of a powder (assuming dense particles) is given in the formula: $(1,500 [nm*m^2/g])/(surface\ area[m^2/g])$=mean particle diameter [nm]. The invention typically is practiced with satisfactory results by using ceramic-containing powders having a surface area greater than about 10 $m^2/g$.

A volume of perhaps 50% of the powder ceramic material should provide particles of sufficiently small size to form the desired reaction product and form the ceramic matrix to replicate desired feature sizes. Larger particles in ceramic powders having multimodal particle sizes or, in mixed powders of two or more materials, may then be carried in dispersed form within the ceramic matrix created by the chemical reaction process between the active powder and reagent. The volume % and size of the sufficiently small particles can be determined, at least in part, by the feature sized to be replicated and the viscosity of the slurry. Desirably, the matrix will flow sufficiently to fill in space between larger particles and the replicated features of the mold or die.

Two components of the baseline CERCANAM™ material slurry, phosphoric acid ($H_3PO_4$) and alumina ($\alpha$-$Al_2O_3$), react to form aluminum phosphate ($AlPO_4$) and water according to the reaction:

$$Al_2O_3 + 2H_3PO_4 \rightarrow 2AlPO_4 + 3H_2O \qquad (1)$$

As per Eq. 1, 101.96 g of $Al_2O_3$ react with phosphoric acid to form 243.9 g of $AlPO_4$. Also, $AlPO_4$ has a lower relative density (2.57) than $\alpha$-$Al_2O_3$ (3.97). Based on these numbers, it can be calculated that one cc of reacted $\alpha$-$Al_2O_3$ is replaced by 3.7 cc of $AlPO_4$, which corresponds to about a 270% increase in solids volume. In reality, the volume change is even higher than that predicted by Eq. 1 because the $AlPO_4$ formed is usually in the hydrated state ($AlPO_4 2H_2O$). This volume expansion counteracts the volume loss due to water removal on drying and allows the nanoparticle slurry to fill in minute features of the die or mold.

Viscosity of the slurry is dependent upon the slurry's solid content. In general, the solid content desirably is made high in a slurry to limit shrinkage of a casting. An upper limit for solid content of the slurry can be determined by the minimum viscosity required to completely fill the mold in which a component is to be cast.

Exemplary CERCANAM™ material-based components have been manufactured to demonstrate two specific properties, namely (1) very precise dimensional tolerance (submicron) with respect to die, or mold, dimensions and/or (2) very high retained surface area. These properties make CERCANAM™ material-based components suitable for applications in two diverse, but equally attractive markets. The possibility of attaining very high tolerances make these CERCANAM™ material components an attractive option for microoptic device fabrication (Application I), where currently-used silicon technology is too slow and relatively expensive for meeting the rapidly increasing demand for optic-fiber connection devices. The submicron dimensional tolerance of a CERCANAM™ material casting permits formation of net-shape, or substantially net-shape, components. The very high surface area, combined with high-temperature performance, also makes these materials attractive as catalytic and adsorbent microcomponents to be used in the chemical industry, such as for gas separation/reforming applications (Application II).

EXAMPLE II

Application I: LoTEx-CERCANAM™ Components for Optical Fiber Interconnects

While dimensional tolerance is a primary concern for an Optical Fiber Interconnect (OFI), there are secondary factors that should be addressed for CERCANAM™ material to be competitive with silicon. For example, since the optical fiber housed in an OFI is in direct contact with the interconnect material, a significant difference in the coefficient of thermal expansion (CTE) between the fiber and interconnect can result in the generation of significant thermal mismatch stresses due to ambient temperature changes. Therefore, it is preferred that the interconnect material has a CTE close to that of glass (1 ppm/° C.), and at least comparable to silicon (3.6 ppm/° C. up to 250° C.). (Note that units of the coefficient of thermal expansion are given in volumetric terms x 1,000,000, or as parts-per-million-per-degree Centigrade.) The baseline CERCANAM™ material discussed in Example I, which is $Al_2O_3$ based, has a CTE that is significantly higher than glass (~9+ppm/° C.) and does not satisfy this CTE matching criterion. Therefore, a new type of CERCANAM™ material was developed, with physical properties tailored to Application I. Specifically, a nanocomposite structure has been developed with a submicron, very-low CTE phase embedded in a matrix of the base CERCANAM™ material to fabricate a new Low Thermal Expansion CERCANAM™ (or LoTEx-CERCANAM™-Ceramatec, Inc., Salt Lake City, Utah, US).

Figure 2:
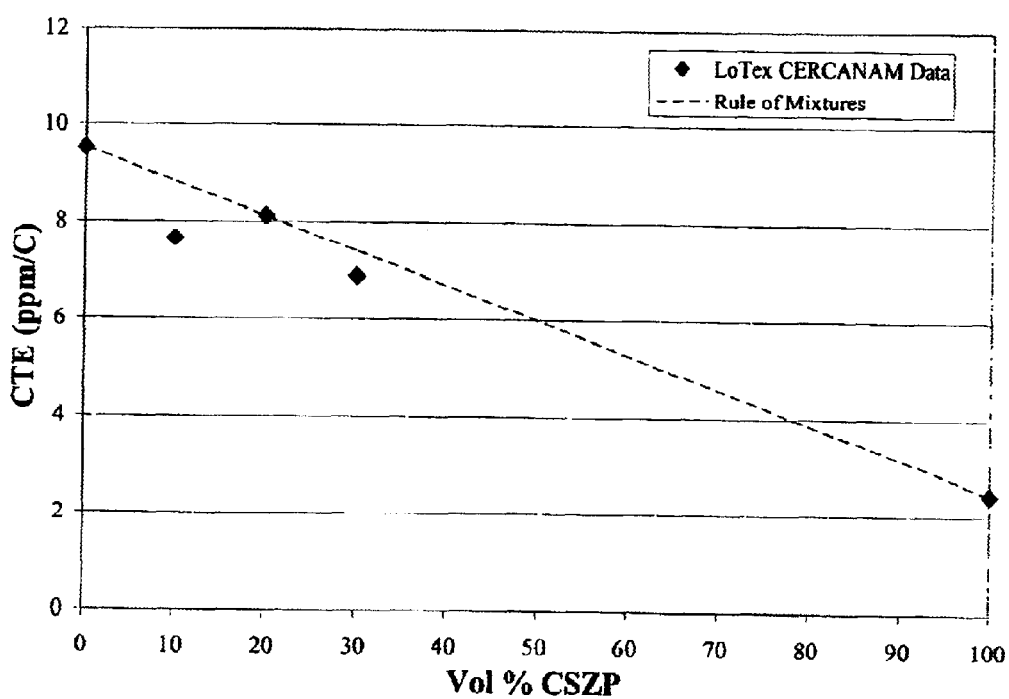
FIG. 2 is a plot comparing experimentally observed CTE to the CTE predicted by the Rule of Mixtures for materials having different volume percentages of two component materials.

Demonstrated herein is the feasibility of lowering the CTE of CERCANAM™ materials by mixing a material having a lower CTE with the base CERCANAM™ material. CSZP ($Ca_{1-x}Sr_xZr_4P_6O_{24}$) materials, a family of near-zero CTE materials belonging to the NZP family (which derives its name from the parent composition $NaZr_2P_3O_{12}$), was chosen as a representative example to demonstrate the addition of a secondary phase to a baseline CERCANAM™ material. The CSZP materials have a strongly bonded three-dimensional network structure of $PO^{4-}$ tetrahedra and $ZrO^{6-}$ octahedra. The reason for their low-CTE behavior is that the sublattices of CZP and SZP show reversed anisotropy in axial thermal expansion behavior. Experimental results show that incorporation of CSZP as a second phase dispersed in a ceramic matrix was successful in lowering the CTE of CERCANAM™-type materials. FIG. 1 shows the strain-temperature plots of CERCANAM™-type materials with varying CSZP concentrations and FIG. 2 shows the mean CTE values calculated from these plots. The data show that adding a second material in combination with the powdered ceramic is operable to modify a physical property of a component formed from the mixture of materials.

In FIG. 2, the dashed line shows the expected rule of mixtures behavior for these materials interpolated between the values for CERCANAM™ material with no CSZP and phase pure sintered CSZP. The very good agreement with the rule of mixtures indicates that the CSZP powders are incorporated into the structure and well-bonded with the CERCANAM™ material phase. If the rule of mixtures is valid over a longer compositional range, the addition of about 50% CSZP should lower the composite CTE to about 6 ppm/° C.

LoTEx-CERCANAM™ material specimens were fabricated by a technique similar to that used previously for CERCANAM™ material in Example I. Coated Si wafers were placed in a polymer mold with the imprinted design facing up. CSZP powders were incorporated into the standard CERCANAM™ material slurry, while continuously mixing with a magnetic stirrer. The slurry was degassed in a vacuum chamber and cast onto the mold. After drying in a drying oven at about 60° C., the green components were fired at various temperatures ranging from 200–600° C. in a conventional furnace in air. Once it was demonstrated that the CTE of CERCANAM™ materials could be lowered by the addition of CSZP powders, it was determined to concentrate on demonstrating microfabrication of structures similar to those required for fiber-optic interconnect components (e.g., V-grooves for fiber alignment) using the new composition.

Figure 3:
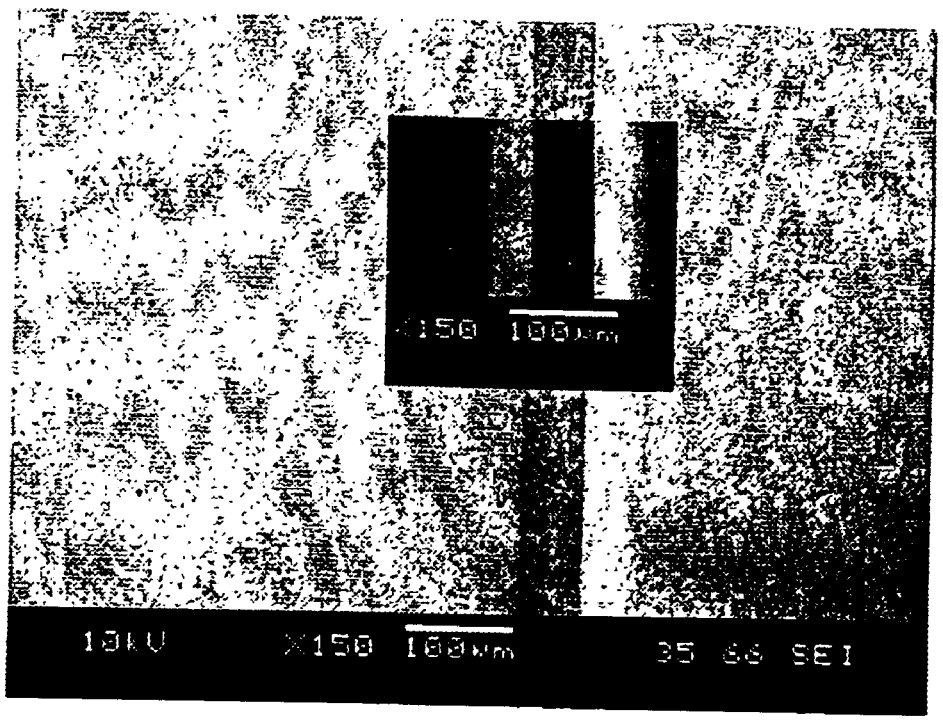
FIG. 3 is a photomicrograph of a mold surface formed on a silicone wafer having an inset photomicrograph corresponding to a surface of a component cast in that mold according to the invention.

FIG. 3 illustrates some of the results from the microfabrication experiments. The base photomicrograph in FIG. 3 is an SEM micrograph of a projection on a silicon wafer which was the mold feature used to imprint a V-groove on LoTEx-CERCANAM™ material. The inset photomicrograph in FIG. 3 shows a V-grooved structure fabricated on a post-fired LoTEx-CERCANAM™ component using this silicon mold. By analyzing the feature at the bottom of the trench in the V-groove imprinted on the LoTEx-CERCANAM™ component and comparing it with the feature on the top of the silicon wafer, from which the trench feature was imprinted, it was estimated that the attainable dimensional tolerance uses this technique. The feature on top of the silicon wafer and the feature at the bottom of the LoTEx-CERCANAM™ material trench were measured to be precisely 54.6±0.66 μm. the error of measurement corresponds to the distance corresponding to one pixel on the digitized micrograph. The mold feature and the reproduced feature in the cast component both measure 83 pixels on the digitized micrographs. Clearly, the results demonstrate the feasibility of fabricating LoTEx-CERCANAM™ material components with submicron dimensional tolerances of features of the cast component with respect to the features on the silicon mold.

The demonstration of the lowering of CTE and the ability to microfabricate structures to submicron precision using this material demonstrates the feasibility of manufacturing optical fiber interconnects using this material/process. However, it should be noted that fiber-optic interconnects are simply one example of one application. A wide variety of applications exist which require precise microfabrication of ceramics to which this material/process is applicable.

EXAMPLE III

Application II: HSA-CERCANAM™ Components as Microchannel Devices for Industrial or Automotive Gas-Phase Separation/Catalysis The next step in the development of industrial catalytic reactors, pollution control techniques, and automotive catalytic converters is the use of stable nanoporous ceramic structures infiltrated with catalysts such as: Pt, Pd, $CeO_2$ and $V_2O_5$ or adsorbents, like zeolites. Ceramic structures will have applicability at high temperatures (up to 900° C.) and can be entirely active as catalytic or adsorbent media. Combined with suitable component design, they can be used to achieve processes that are much more cost-effective and efficient than current technology.

It has been observed that CERCANAM™ materials may be fabricated, with appropriate modifications in processing techniques, to form very high surface area structures even after heat treatment including firing at temperatures as high as 600–900° C. These types of materials maybe referred to as High Surface Area CERCANAM™ (HSA-CERCANAM™-Ceramatec, Inc., Salt Lake City, Utah, US). Changes in processing techniques from the baseline CERCANAM™ material can include starting with a ceramic material having higher surface area. A lower reagent concentration may also increase surface area of the cast material. Additionally, a pore-former can be added to enhance the surface area of HSA-CERCANAM™ material. Similar phosphate bonded ceramics have been reported to have very good thermomechanical properties at temperatures as high as 1,000° C. These properties make HSA-CERCANAM™ material an attractive option for application as a ceramic support for catalysis and adsorption, with the appropriate catalytic materials (e.g., $V_2O_5$, $TiO_2$, $CeO_2$, Pt, Pd) or adsorbents (zeolites) deposited in the nanopores.

Since the component fabrication technique is a relatively easy casting technique, HSA-CERCANAM™ material can be very easily used to fabricate microchannel devices. HSA-CERCANAM™ material will have much better corrosion resistance and mechanical properties (up to 900° C.) as compared to silicon components. The higher surface area as compared to that which can be achieved by other ceramics is expected to make this material very attractive in a number of gas phase separation/catalysis-related applications.

Figure 4:
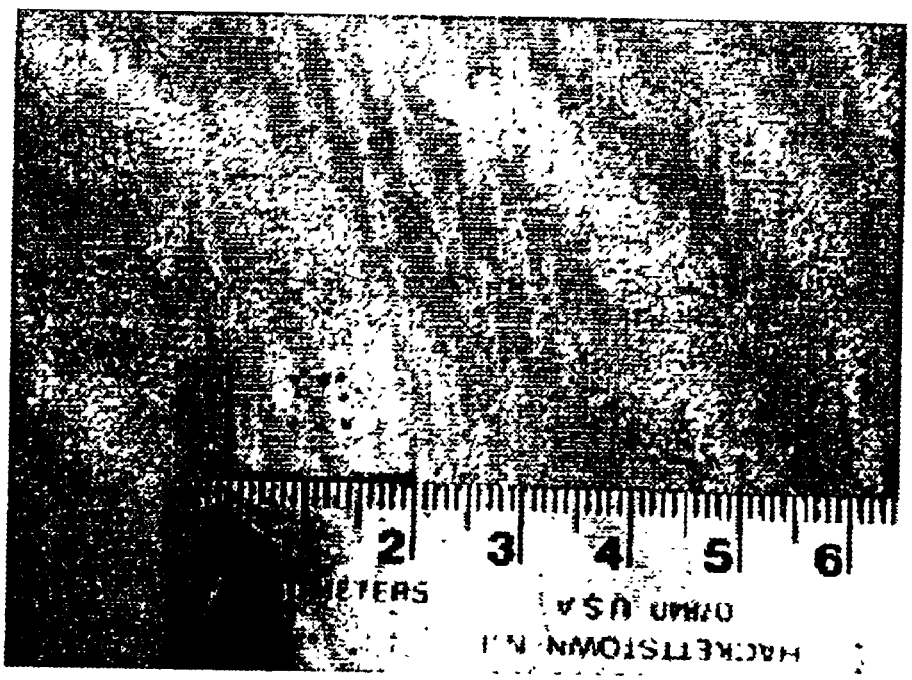
FIG. 4 is a photograph illustrating a cast component formed according to the invention and having molded-in cores removed to leave nine conduits through the component.

By addition of a pore-former in a process similar to that outlined in Example II, HSA-CERCANAM™ materials were fabricated with the highest surface areas obtained to date for monolithic alumina-based ceramics. FIG. 4 is a photograph of one exemplary HSA-CERCANAM™ component. The component has nine through-holes incorporated into it. The through-holes are conduits formed by extracting mold-core pins from the dried slurry. This demonstrates the feasibility of easily fabricating channeled structures using this material. By analyzing the surface area of small 5–10 mm pieces cut or broken off from such components, it was demonstrated that these solids can be fabricated with surface areas as high as about 100 $m^2/g$. This measured surface area for HSA-CERCANAM™ exceeds the highest surface area for monolithic alumina ceramics from the literature (~35–50 $m^2/g$) by a factor of perhaps 2 to 3 (exclusive of anodic alumina).

Figure 5:
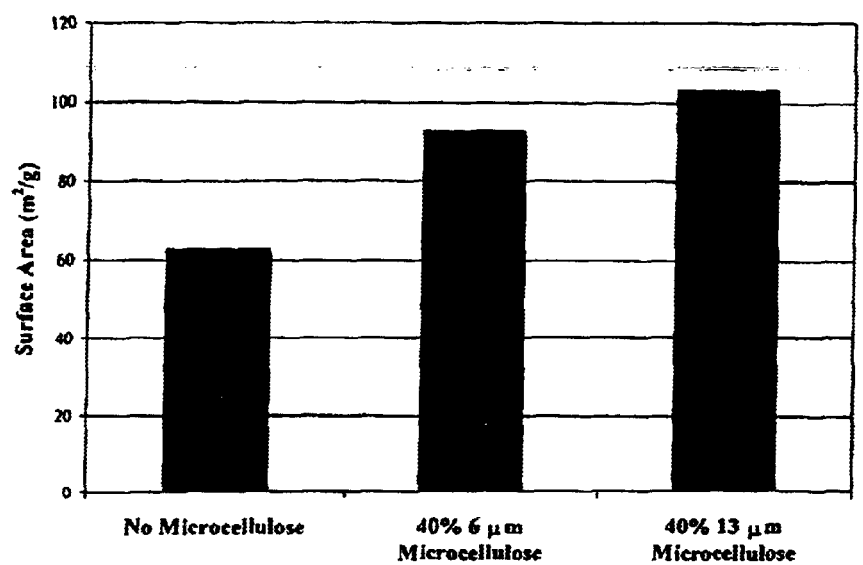
FIG. 5 is a bar graph illustrating changes in surface area for cast components formed to include different size microcellulose particles.

FIG. 5 shows the effect of microcellulose additions on measured surface area of HSA-CERCANAM™. When no microcellulose was added, a surface area of about 60 $m^2/g$ was obtained for the specific process parameters used (Binder: 2 wt % Ceramabind 830, slurry solid content: 28%). The addition of 40 vol % of microcellulose of 6 μm or 13 μm mean particle size had a beneficial effect on the measured surface area: 6 μm microcellulose gave a surface area of about 85 $m^2/g$, and 13 μm microcellulose gave a surface area of over 100 $m^2/g$.

It may seem counter-intuitive that a coarser pore-former particlesize (which leads to a coarser pore distribution) leads to a higher surface area, but it should be pointed out that the larger pores left behind by the combustion of the pore-former will contribute very little in adding to the surface area, as the increase in actual surface area due to these pores is expected to be less than 1 m$^2$/g. Therefore, the role of the pore-former is believed to be in opening up the structure to allow the gas to penetrate the structure.

Figure 6A:
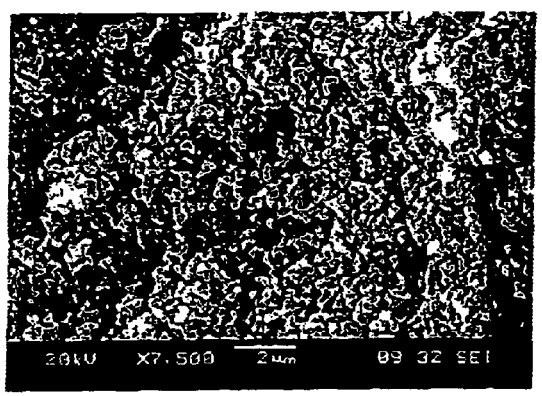
FIGS. 6A and 6B are scanning electron microscope (SEM) photomicrographs of the structure of a ceramic material formed according to the invention and lacking a pore-former material.
Figure 6B:
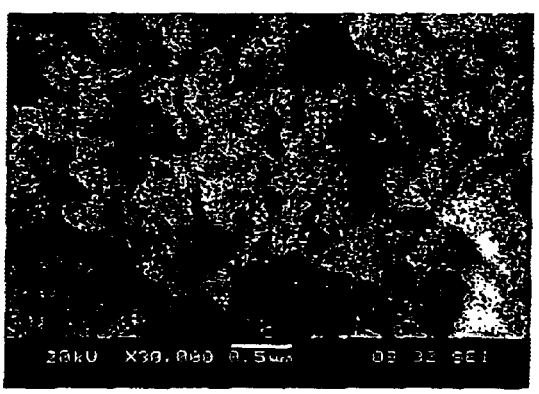
Figure 6C:
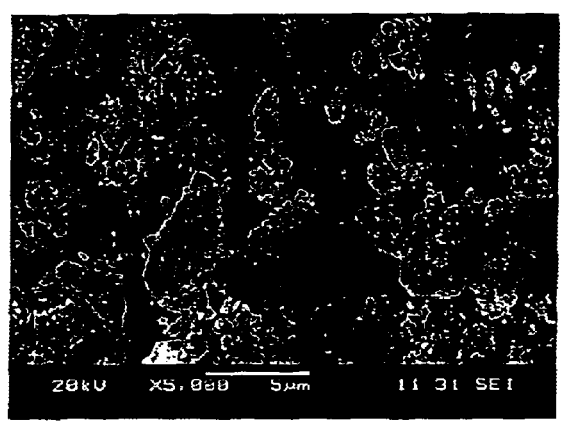
FIG. 6C is an SEM photomicrograph of the structure of the ceramic material of FIGS. 6A and 6B and further including a pore-former material.

This effect of the pore-former is corroborated by SEM studies of HSA-CERCANAM™ material with and without microcellulose, as shown in FIGS. 6A–6C. FIGS. 6A and 6B are micrographs of an HSA-CERCANAM™ material specimen that had no microcellulose added during processing and had a surface area of about 60 m$^2$/g. Most of the porosity seems to be in the submicron to nano-scale with many pores clearly seen in FIG. 6B to be less than 100 nm in size.

FIG. 6C shows the microstructure of an HSA-CERCANAM™ material component fabricated with the addition of 40 vol % of microcellulose with a mean particle size of 13 μm. clearly the pore structure is bimodal with some large pores left behind by pore-former combustion, and submicron and nano porosity intrinsic to the material. There also seems to be some evidence of densification of some large alumina grains, which did not affect the component surface area.

Figure 7:
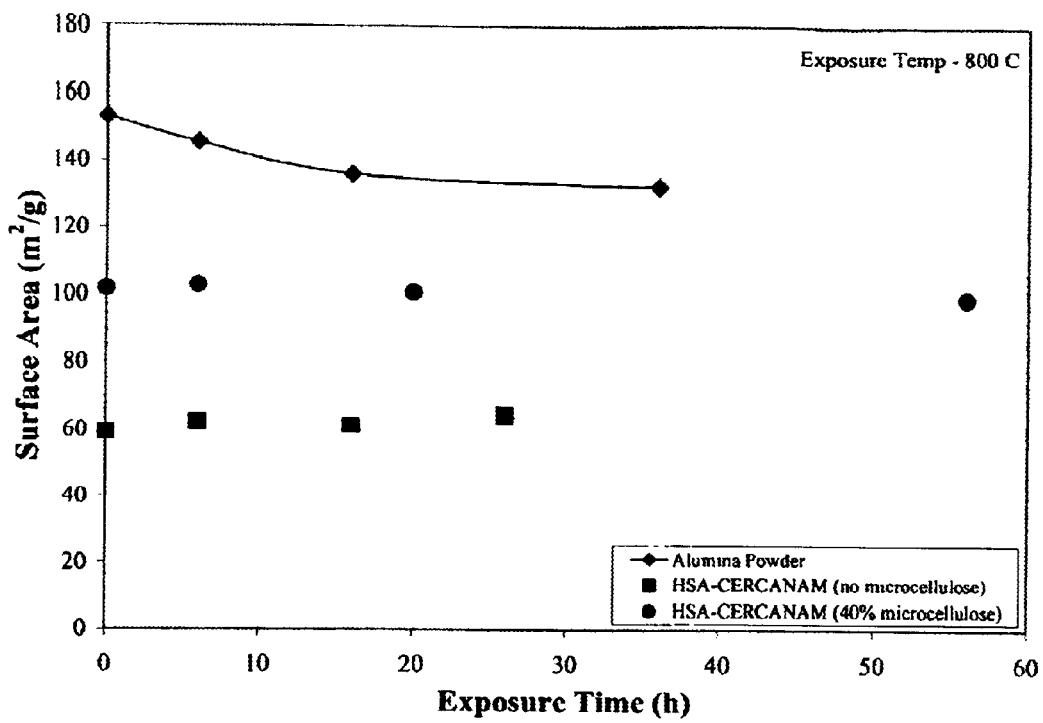
FIG. 7 is a plot illustrating the effect of time of exposure at elevated temperature on surface area for Alumina powder, compared to two ceramic materials formed according to the invention.

An important requirement for the use of high-surface area components at the high temperature expected in gas phase chemical catalysis (typically 500–700° C.) is that the surface area of these components should be retained after a sustained time at high-temperature exposure. To simulate worst-case conditions, exposure testing of certain ceramics at 800–1000° C. was performed. FIG. 7 shows the variation of surface area with exposure time for two HSA-CERCANAM™ components, one fabricated with microcellulose additions and another with no microcellulose added, as well as the starting alumina powder. While the alumina powder lost nearly 15% of the starting surface area after 36 hours of thermal exposure, both the HSA-CERCANAM™ components retained their surface area within limits of experimental error.

Figure 8:
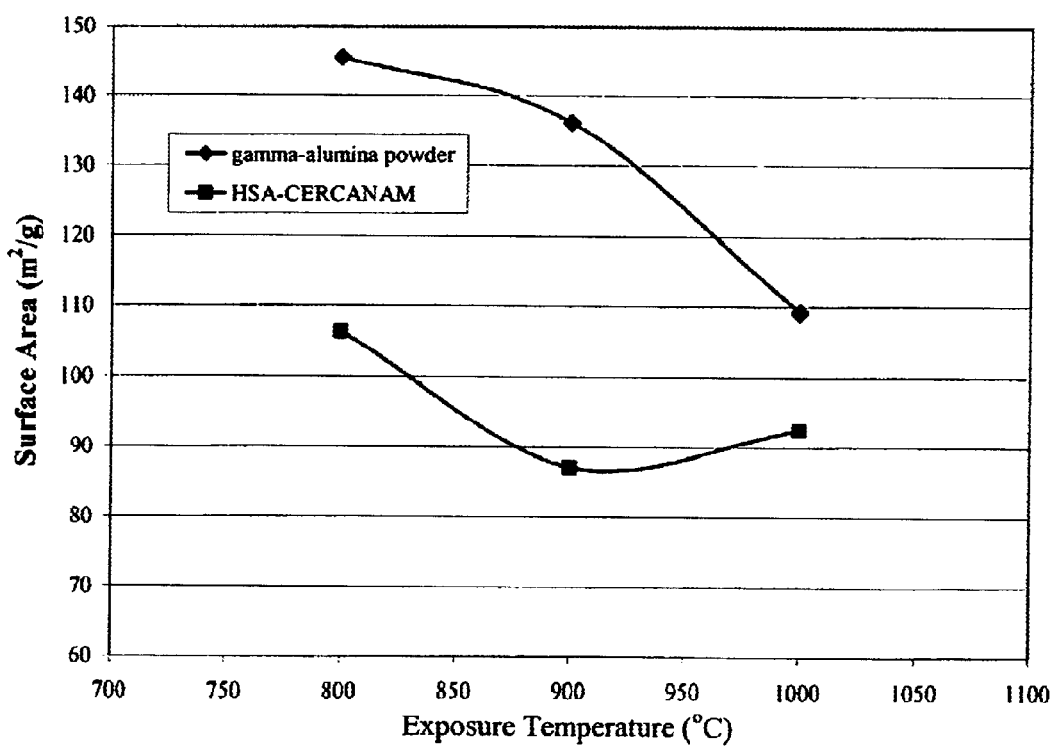
FIG. 8 is a plot illustrating the effect of exposure to elevated temperature on surface area for g-Alumina powder, compared to a ceramic material formed according to the invention.

FIG. 8 shows the surface area as a function of exposure temperature after γ-Al$_2$O$_3$ powders and CERCANAM™ material components are fired at 3 different temperatures. The HSA-CERCANAM™ materials retained their surface area even after firing at 1000° C., whereas the γ-Al$_2$O$_3$ powders lost nearly 30% of their surface area after 6 hours at 1000° C.

X-Ray Diffraction (XRD) of the γ-Al$_2$O$_3$ powder and HSA-CERCANAM™ material components subjected to these temperatures indicates that the γ-Al$_2$O$_3$ to α-Al$_2$O$_3$ transformation is clearly underway in the powders at 1000° C., whereas the HSA-CERCANAM™ components retain their γ-Al$_2$O$_3$ structure. Further, the γ-Al$_2$O$_3$ peaks in the powders become narrower after the high-T exposure, suggesting that there is significant crystallite growth of the γ-phase also taking place. Such peak narrowing is not seen in the HSA-CERCANAM™ material components, suggesting that crystallite growth is relatively insignificant. It is likely that this difference is due to the phosphate phase at the interparticular boundaries that prevents particle-to-particle contact between alumina particles in the HSA-CERCANAM™ material component.

These results clearly demonstrate the feasibility of HSA-CERCANAM™ material components for high-temperature applications. It should be noted that the high surface area alumina powder still has a surface area of about 109 m$^2$/g after 1000° C., which is still higher than that of any of the HSA-CERCANAM™ material components. However, the goal is not to get a surface area higher than the powder, but to create a high-surface area solid. In many catalytic reactions, using a powder catalyst is impractical due to the high back pressures created by a packed bed, which is precisely the problem addressed through the development of HSA-CERCANAM™ material microchannel devices.

Physical property modifications may be made to baseline CERCANAM™ materials by the simple addition of a second phase into the baseline ceramic matrix. The second phase maybe in the form of a reinforcement, e.g., whisker, fiber, or a particle, that is operable to change a component's porosity, toughness, CTE, Young's modulus, conductivity—both ion and electron, or some other physical property. Certain components may benefit from being formed from powder having a multimodal particle size.

The inventive process is capable of reproducing features in a cast or stamped component that are smaller than about 1 mm. Certain reproducible mold or die features may be less than about 0.1 mm in size. In certain embodiments, reproduced features may be smaller than about one micrometer. In other embodiments, such features may be smaller than about 500 nm. In any event, the instant process offers the capability to reproduce features of a mold or die with a dimensional tolerance of the reproduced features on the order of tens-of-micron to submicron fidelity. In general, the smaller the particle size or at least a portion of the powder ceramic material, the smaller the feature size that may be reproduced with satisfactory dimensional tolerance.

Desirable particle size for ceramic-based powders used in the invention is generally at least an order of magnitude smaller than the smallest feature to replicate. However, the converse is not true. That is, features having a size of a meter or more may be formed from nanopowder CERCANAM™ material.

Features of a component are formable by casting, molding, and/or by removing a core by simple extraction, or by burning, melting, or otherwise removing the core from the component. Another option for microfabrication using CERCANAM™ materials is to tape cast or slip cast the slurry, and as it starts to dry and the viscosity increases, a punch with the desired microfeatures can be used to stamp the features onto the CERCANAM™ material. The punch may be left in until after drying is complete, or could be withdrawn after the punching operation.

REFERENCES

Chen, C. P. and M. H. Leipold, "Fracture toughness of silicon," Am. Ceram. Soc. Bull. 59[4] 469–72 (1980).

Declerck, G. J., "Silicon oxidation," Microelectron. Mater. Processes 164 79–132 (1989).

S. E. Grover, S. Y. Jeong, A. Wagh, T. R. West, "Low-temperature synthesis of berlinite-bonded alumina ceramics," Ceram. Trans. 108 1042–1122 (2000).

Heness, G. L. and B. Ben-Nissan "Fabrication of phosphate-bonded alumina bioceramic composites," J. Aust. Ceram. Soc. 24[1] 69–80 (1988).

Peall, R. G., "Securing an Optical Fibre in a V-Groove," U.S. Pat. No. 5,985,086 (1999).

Seo, P. S., H. J. Lee, T. H. Rhee, H. S. Kim and S. Y. Yi, "Optical fiber Passive Alignment and Method Therefor," U.S. Pat. No. 6,157,759 (2000).

Mitani, K., "Silicon Wafer Bonding: An Overview," Proc. Electrochem. Soc. 97–36 1–12 (1998).

Balagopal. S., D. Agrawal, "High Temperature Flexural Strength of Ca1-xSrXZr4P6O24 Ceramics," submitted to J. Am. Ceram. Soc.

Roy, R., and E. R. Vance, J. Alamo. "[NZP], a New Radiophase for Ceramic Waste Forms," Mat. Res. Bull. 17 585–589 (1982).

"Air Pollution Technology Fact Sheet: Packed Bed/Packed Tower Wet Scrubber," EPA-CIFA Fact Sheet, http://www.epa.gov/ttn/catc/products.html#cccinfo (1998).

"Air Pollution Technology Fact Sheet: Spray-Chamber/Spray-Tower Wet Scrubber," EPA-CIFA Fact Sheet, http://www.epa.gov/ttn/catc/products.html#cccinfo (1998).

"Fracture of phosphate-bonded high-alumina refractories," F. J. Gonzalez and J. W. Halloran, Am. Ceram. Soc. Bull. 62[7] 798–803 (1983).

"Zeolite: A versatile Air Pollutant Adsorber," EPA Technical Bulletin No. EPA 456/F-98-004 (1998).

What is claimed is:

1. A process for casting components, the process comprising:
   a) combining a first ingredient comprising a ceramic powder, with a reagent to form a slurry;
   b) casting said slurry in a mold;
   c) curing said slurry in said mold at a temperature below about 100° C. to form a green component by a process including chemical reaction bonding of said ceramic powder under the influence of said reagent; and
   d) applying a heat treatment at a temperature below about 1000° C. to said green component; wherein said ceramic powder has a mean particle size between about submicron and one nanometer.

2. The process of claim 1, wherein said reagent is a liquid.

3. The process of claim 2, wherein said liquid is acidic.

4. The process of claim 2, wherein said liquid is basic.

5. The process of claim 1, wherein said ceramic powder has a controlled particle size distribution ranging from about 1 nanometer to about 500 nanometers.

6. The process of claim 1, further comprising: adding a second ingredient in powder form into said slurry.

7. The process of claim 6, wherein said ceramic powder and said second ingredient are premixed in powder form.

8. The process of claim 6, wherein said first ingredient and said second ingredient have a multimodal particle size distribution in combination.

9. The process of claim 6, wherein said second ingredient comprises a metallic powder.

10. The process of claim 1, further including, between steps c) and d), the step of removing said green component from said mold.

11. The process of claim 1, further comprising, prior to b), placing a core into said mold to define a shape in said component; and subsequent to c), removing said core from said component.

12. The process of claim 1, further comprising: adding a second material in combination with said first ingredient, said second material being operative to modify a physical property of said component.

13. The process of claim 12, wherein said second material comprises a pore-former.

14. The process of claim 12, wherein said second material exhibits a coefficient of thermal expansion that is lower than the coefficient of thermal expansion of said ceramic material.

15. The process of claim 12, wherein said second material comprises a reinforcing phase operable to improve a physical property of said component.

16. The process of claim 15, said reinforcing phase comprising a fiber.

17. The process of claim 12, wherein said second material comprises an ion conducting material.

18. The process of claim 12, wherein said second material comprises a catalytic material.

19. The process of claim 12, wherein said second material comprises an electrically conductive material.

20. A casting process to form components having a ceramic matrix, the casting process comprising:
   a) providing a ceramic powder, said ceramic powder having a surface area in excess of about 10 m$^2$/gram;
   b) providing a reagent;
   c) mixing said ceramic powder and said reagent to form a slurry;
   d) casting said slurry in a mold;
   e) curing said slurry in said mold at a first temperature to form a green component by a process including chemical reaction bonding of said ceramic powder under the influence of said reagent; and
   f) applying a heat treatment, comprising a second temperature, to said green component.

21. The casting process of claim 20 wherein the first temperature is below about 100° C.

22. The casting process of claim 20 wherein the second temperature is below about 1000° C.

23. A component having a ceramic matrix, said component formed by the process of claim 20, said component adapted for use in electronic packaging.

24. A component having a ceramic matrix, said component formed by the process of claim 20, said component adapted for use as a microchannel device.

25. A process for casting components having reproducible features with a size smaller than about 1 millimeter ($10^{-3}$ m) and holding a dimensional tolerance of less than about 10 micrometers, said process comprising:
   a) combining a ceramic powder with a reagent to form a slurry;
   b) casting said slurry in a mold;
   c) curing said slurry in the mold at a first temperature below about 100° C. to form a green component by a process including chemical reaction bonding of said ceramic powder under the influence of said reagent; and
   d) applying a heat treatment, comprising a second temperature, to said green component.

26. The process of claim 25, wherein a portion of said ceramic powder has a surface area in excess of about 10 m$^2$/gram.

27. The process of claim 25, wherein a portion of said ceramic powder has a mean particle size of less than about one micrometer ($10^{-6}$ m).

28. The process of claim 25, wherein a portion of said ceramic powder has a mean particle size of less than about 150 nanometers ($150 \times 10^{-9}$ m).

29. The process of claim 25, wherein said first temperature is below about 100° C.

30. The process of claim 25, wherein said second temperature is below about 1000° C.

31. The process of claim 25, further comprising:
   including a second material in said slurry, said second material being operative to modify a physical property of said component.

32. The process of claim 31, wherein said physical property is selected from the group consisting of: porosity, coefficient of thermal expansion, conductivity, toughness, strength, Young's modulus, and damage tolerance.

33. The process of claim 25, further comprising, prior to b), placing a core into said mold to define a shape in said component; and subsequent to c), removing said core from said component.

34. The process of claim 25, further comprising, subsequent to b), and before curing is complete in c) so that said green component retains some viscous flow capability, punching one or more surfaces of said green component with a die having a desired pattern of microfeatures.

35. The process of claim 25, further comprising, subsequent to b), and before curing is complete in c) so that said green component retains some viscous flow capability, punching one or more surfaces of said green component with a die having a desired pattern of microfeatures.

36. A component produced by the process of claim 1.

37. A component having a ceramic matrix, the component cast by the casting process of claim 20.

38. A set of components having reproducible features and a size smaller than about 1 millimeter ($10^{-3}$ m) and further holding a dimensional tolerance of less than about 10 micrometers, the set of components cast by the process of claim 25.

39. A set of ceramic-casted nanomaterials, each of said set having reproducible features from about one-tenth of a millimeter to about one micron, and further having replicated features from a mold surface with about a 1 micron tolerance.

40. The set of ceramic-casted nanomaterials of claim 39 wherein the ceramic-casted nanomaterials have a ceramic matrix.

41. A process for casting components, the process comprising:
   a) combining a first ingredient comprising a ceramic powder, with a reagent to form a slurry;
   b) adding a second ingredient comprising a metallic powder to said slurry;
   c) casting said slurry in a mold;
   d) curing said slurry in said mold at a temperature below about 100° C. to form a green component by a process including chemical reaction bonding of said ceramic powder under the influence of said reagent; and
   e) applying a heat treatment at a temperature below about 1000° C. to said green component;
wherein said ceramic powder has a mean particle size between about submicron and one nanometer.

42. A process for casting components, the process comprising:
   a) combining a first ingredient comprising a ceramic powder, with a reagent to form a slurry;
   b) placing a core into a mold;
   c) casting said slurry in said mold;
   d) curing said slurry in said mold at a temperature below about 100° C. to form a green component by a process including chemical reaction bonding of said ceramic powder under the influence of said reagent;
   e) removing said core from said component; and
   f) applying a heat treatment at a temperature below about 1000° C. to said green component; wherein said ceramic powder has a mean particle size between about submicron and one nanometer.

43. A process for casting components having reproducible features with a size smaller than about 1 millimeter ($10^{-1}$ m) and holding a dimensional tolerance of less than about 10 micrometers, said process comprising:
   a) combining a ceramic powder with a reagent to form a slurry;
   b) placing a core into a mold;
   c) casting said slurry in said mold;
   d) curing said slurry in the mold at a first temperature below about 100° C. to form a green component by a process including chemical reaction bonding of said ceramic powder under the influence of said reagent;
   e) removing said core from said component; and
   f) applying a heat treatment, comprising a second temperature, to said green component.

44. A process for casting components having reproducible features with a size smaller than about 1 millimeter ($10^{-3}$ m) and holding a dimensional tolerance of less than about 10 micrometers, said process comprising:
   a) combining a ceramic powder with a reagent to form a slurry;
   b) casting said slurry in a mold;
   c) curing said slurry in the mold at a first temperature below about 100° C. to form a green component by a process including chemical reaction bonding of said ceramic powder under the influence of said reagent;
   d) forming a shape in said green component by stamping operation; and
   e) applying a heat treatment, comprising a second temperature, to said green component.

45. A process for casting components having reproducible features with a size smaller than about 1 millimeter ($10^{-3}$ m) and holding a dimensional tolerance of less than about 10 micrometers, said process comprising:
   a) combining a ceramic powder with a reagent to form a slurry;
   b) casting said slurry in a mold;
   c) curing said slurry in the mold at a first temperature below about 100° C. to form a green component by a process including chemical reaction bonding of said ceramic powder under the influence of said reagent;
   d) punching one or more surfaces of said green component with a die having a desired pattern of microfeatures subsequent to said casting and before said curing is complete; and
   e) applying a heat treatment, comprising a second temperature, to said green component.

* * * * *